United States Patent [19]

Horner, Jr.

[11] Patent Number: 5,117,860

[45] Date of Patent: Jun. 2, 1992

[54] CHECK VALVE

[75] Inventor: Charles B. Horner, Jr., South Bend, Ind.

[73] Assignee: Allied-Signal Inc., Morristown, N.J.

[21] Appl. No.: 781,545

[22] Filed: Oct. 22, 1991

[51] Int. Cl.⁵ ............................................. F16K 15/02
[52] U.S. Cl. .............................. 137/512.1; 137/512.2; 137/512.3; 137/526
[58] Field of Search ............... 137/512.1, 512.2, 512.3, 137/526

[56] References Cited

U.S. PATENT DOCUMENTS

| | | | |
|---|---|---|---|
| 2,296,492 | 9/1942 | Begley | 137/512.1 |
| 2,947,314 | 8/1960 | Bloom | 137/512.2 X |
| 4,886,085 | 12/1989 | Miller | 137/526 X |

Primary Examiner—Robert G. Nilson
Attorney, Agent, or Firm—Leo H. McCormick, Jr.; Ken C. Decker

[57] ABSTRACT

A check valve for use in the evacuation of air from a system having primary and secondary disc retained in a chamber of the housing and responsive to first and second forces developed by the creation of a fluid pressure differential between the fluid pressure of air in a first member and a source of vacuum to control the evacuation of air from the member by the source of vacuum. The primary disc is located on a stem that extends from the secondary disc to cover a plurality of openings which connect the inlet port to the chamber. A spring holds the secondary disc against the housing. The first force which develops as a result of a pressure differential between the fluid pressure of air and vacuum moves the primary disc to allow air to be evacuated through the openings in the secondary disc. Should the fluid pressure in the air located in the first member exceed a predetermined value, the second force develops which acts on the secondary disc to allow a larger volume of air to be evacuated in a shorter time. A tang on the secondary disc engages the housing to prevent the development of vibrations therein when air is evacuated as a result of movement by the secondary disc. When the fluid pressure of the air is reduced to a predetermined fluid pressure, a spring moves the secondary disc into engagement with the housing and the evacuation of air is again through the openings in the secondary disc as controlled by the first disc.

6 Claims, 1 Drawing Sheet

CHECK VALVE

This invention relates to a check valve having a primary and secondary disc which are sequentially actuated to allow a source of vacuum to evacuate air from a system.

Check valves are used in brake systems for automobiles to retain a desired fluid pressure level in power assist boosters. In such check valves, U.S. Pat. Nos. 3,086,544 and 3,626,978 being typical, a concave flexible plate or disc is retained on a stem to cover a plurality of openings in the housing. The openings being connected to an inlet port through which air is evacuated from the booster after a brake application. However in recent years, the available vacuum level in internal combustion engines used in vehicles has changed as a result of additional demands and pollution controls. In an effort to maintain the operational response time with respect to evacuation of air from such power assist boosters, the openings in the check valve were enlarged and the number increased. When the size of the openings were increased, the flexible disc was also enlarged and a spring was added to assure that the openings were sealed when the fluid pressure level in the power assist booster reached a predetermined level. This type structure performs in an adequate manner to control the evacuation of air from the power assist booster, however, under some flow conditions, the flexible disc vibrates and creates noise. It has been disclosed and structure disclosed in U.S. Pat. Nos. 4,628,959; 4,724,867 and 4,750,517 that a side load applied to the stem on which the disc is retained could attenuate vibrations that cause noise. Unfortunately, the physical size of the structure to develop the side load is relatively small and would require special consideration during manufacture. Further, during low flow of the evacuation of air, the side load can reduce the effectiveness of the closure spring.

In the present invention, I have designed a two stage check valve for use in the evacuation of air from a power booster in a brake system. In this check valve the housing has a chamber with a groove therein connected to an inlet port and an outlet port. The inlet port is connected to the power booster and the outlet port is connected to a source of vacuum. The inlet port is separated from the outlet by primary and secondary disc members located in the chamber. The secondary disc member has a stem that extends from substantially the center thereof into a guide in the housing, a plurality of openings that surround the stem and a peripheral surface thereon. A resilient flange which surrounds the peripheral surface has an annular rib that is designed to engage the housing surrounding the groove and at least one radial tang that engages the side wall of the chamber. The primary disc member which is flexible and retained on the stem of the secondary disc member covers the plurality of openings in the secondary disc member. A spring located in the chamber acts on the secondary disc member to urge the annular rib into sealing engagement with the housing. Any air in the power assist booster develops a pressure differential across the primary and secondary disc members. As long as the pressure differential is below a predetermined value as determined by the closure force of the spring, a first pressure differential creates a first force which moves the primary disc member away from the plurality of openings to allow vacuum to evacuate air from the power assist booster to reduce the fluid pressure of the air therein to substantially the fluid pressure of the source of vacuum. Should the pressure differential be above the predetermined value, a second pressure differential develops a force which acts on the primary and secondary disc members to overcome the spring and move the resilient flange on the peripheral surface of the secondary disc member away from said housing to allow air to flow from the inlet port though the chamber to the outlet port to lower the fluid pressure of air in the power assist booster. The radial tangs on the resilient flange engage the side wall of the chamber to dampen any vibrations that may occur due to the turbulent flow of air from the inlet port to the outlet port. When the fluid pressure in the power assist booster is reduced to a predetermined level the spring again moves said resilient flange on the peripheral surface back into engagement with said housing to terminate the directed flow of air from the inlet port to the outlet port and reinstitute control of air flow from the power assist booster through the plurality of openings in the secondary disc member by the primary disc member.

It is an object of this invention to provide a check valve with primary and secondary disc members that can be sequentially activated to evacuate air from a power assist booster for a brake system.

It is a further object of this invention to provide a check valve with a primary and secondary disc members that control the flow of air from an inlet port to an outlet port in response to a pressure differential in a fluid between the inlet port and outlet port with radial tangs that engage the housing of the check valve to reduce the creation of vibrations of the secondary disc that would cause noise as a result of the flow of fluid from the inlet port to the outlet port.

These object and others should be apparent from reading this specification while viewing the drawings wherein:

FIG. 1 is a sectional view of a check valve made according to the principles of this invention when the fluid pressure of fluid in a system is substantially the same at the inlet port and the outlet port;

FIG. 2 is a sectional view of the check valve of FIG. 1 wherein fluid flow from the inlet port to the outlet port is controlled by the primary disc member in response to a first pressure differential level in the fluid between the inlet port and the outlet port; and FIG. 3 is a sectional view of the check valve of FIG. 1 wherein fluid flow from the inlet port to the outlet port is controlled by the secondary disc member in response to a second pressure differential level in the fluid between the inlet port and the outlet port.

DETAILED DESCRIPTION

Figure 1:
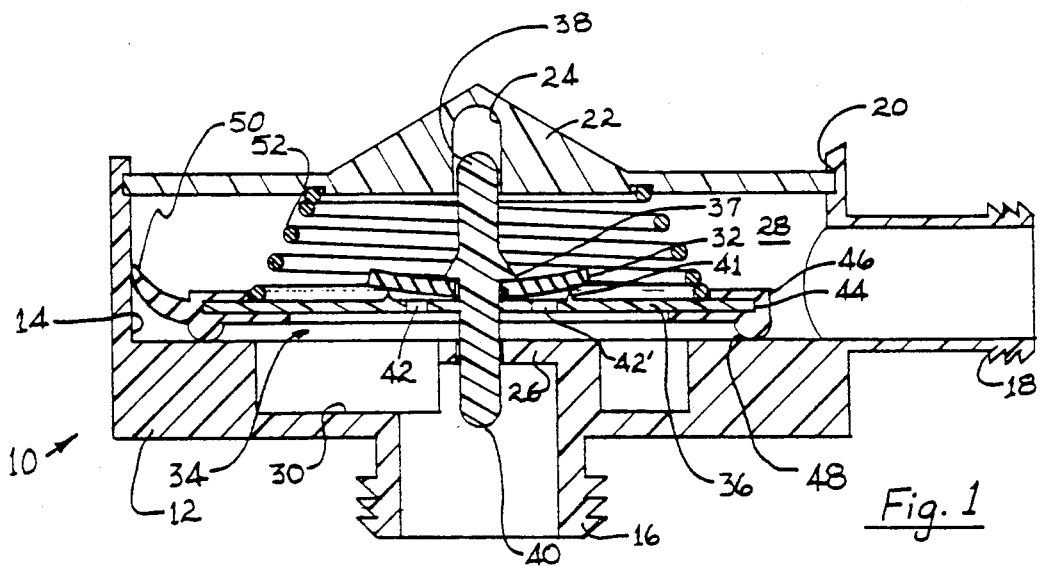

The check valve 10 shown in FIG. 1 has a housing 12 with a bore 14 therein. Housing 12 has an inlet port 16 which is adapted to be connected to a power assist booster and an outlet port 18 which is adapted to be connected to a source of vacuum, typically the inlet manifold of an internal combustion engine. Housing 12 has a groove 20 located in bore 14 for retaining end cap 22 and aligning guide 24 therein with guide 26 located in inlet port 16. With end cap located in groove 20, a chamber 28 is formed in housing 12 between the inlet port 16 and outlet port 18. Housing 12 has a groove 30 which forms a step or extension of bore 14 surrounds inlet port 16 and directs the flow of air into check valve 10. The evacuation of air from the power assist booster through the check valve 10 to the source of vacuum is controlled by primary and secondary disc members 32 and 34, respectively, located in chamber 28. The primary disc member 32 which is carried by the secondary disc member 34 controls the evacuation of air when the fluid pressure in the power assist booster approaches the fluid pressure of the source of vacuum while the secondary disc member 34 controls the evacuation of air when the fluid pressure differential exceeds a predetermined value.

The secondary disc member 34 has a body 36 with a first stem 38 that extends from substantially the center thereof into guide 24 and a second stem 40 that extends into guide 26, a plurality of openings 42, 42' that surround the first and second stems 38 and 40, an annular seat 41 which surrounds the plurality of openings 42, 42' and a peripheral surface 44 thereon. A resilient flange member 46 which surrounds peripheral surface 44 has an annular rib 48 that is designed to engage housing 12 and seal groove 30 from chamber 28. The resilient flange member 46 has at least one, and depending upon the expected air flow through chamber 28, tang 50 which engages the side wall of bore 14 the purpose of which will be explained later with respect to the functional operation of check valve 10.

The primary disc member 32 is retained on the first stem 38 by a shoulder 37. The primary disc member 32 which is initially substantially parallel to the secondary disc member 34 is flexible and when placed on stem 38 assumes a concave shape on engagement with annular seat 41 as shown in FIG. 1 to cover the plurality of openings 42, 42' in the secondary disc member 34.

A spring or resilient means 52 located between end cap 22 and body 36 of the secondary disc member 34 urges rib 48 on flange member 44 into engagement with the housing surrounding groove 30 to normally seal chamber 28 from the inlet port 16.

MODE OF OPERATION

Figure 2:
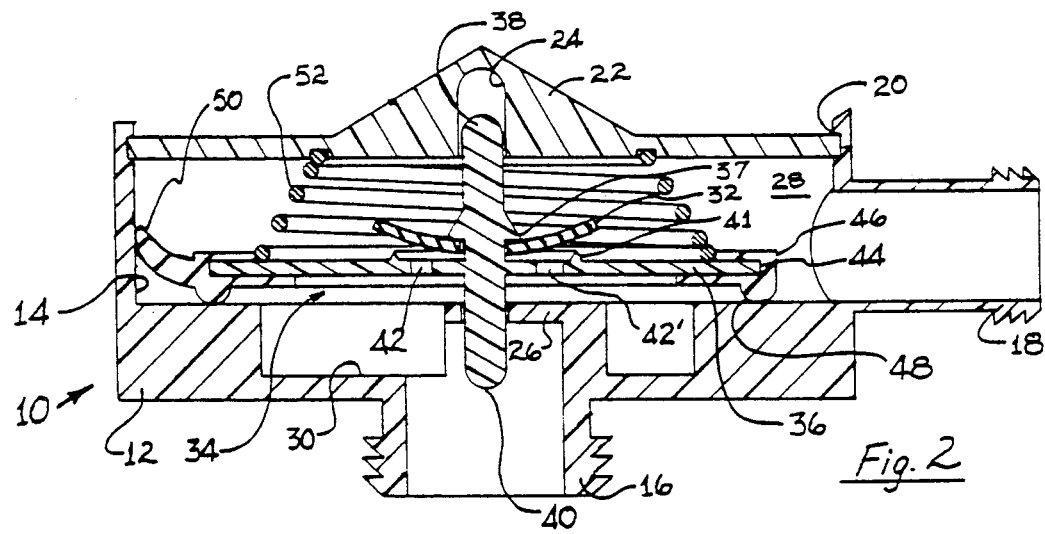

When an internal combustion engine is operating, vacuum is produced and communicated to outlet port 18 of check valve 10 by an appropriate conduit. Air in a power assist booster having a fluid pressure greater than the level of vacuum communicated to inlet port 16 develops an operational pressure differential between the inlet port 16 and outlet port 18. In the absence of a brake application, this operational pressure differential would be low and may not be sufficient to move either the primary or secondary disc members 32 and 34 away from their respective seats to alleviated the operational pressure differential. However, assume that a brake application has occurred and some air has been communicated into the brake system by way of the power assist booster sufficient to develop a pressure differential between the inlet port 16 and outlet port 18. This operational pressure differential acts on the primary disc member 32 and secondary disc member 34 to produce an operational force. When the operational force is less than the spring force of spring 52, the operational pressure differential creates a first force which acts on and moves the primary disc member 32 away from seat 41, as illustrated in FIG. 2, to allow air to be evacuated from the power assist booster by flowing through the plurality of openings 42, 42' to reduce the fluid pressure of the air in the power assist booster to substantially the fluid pressure of the vacuum presented to outlet port 18.

Figure 3:
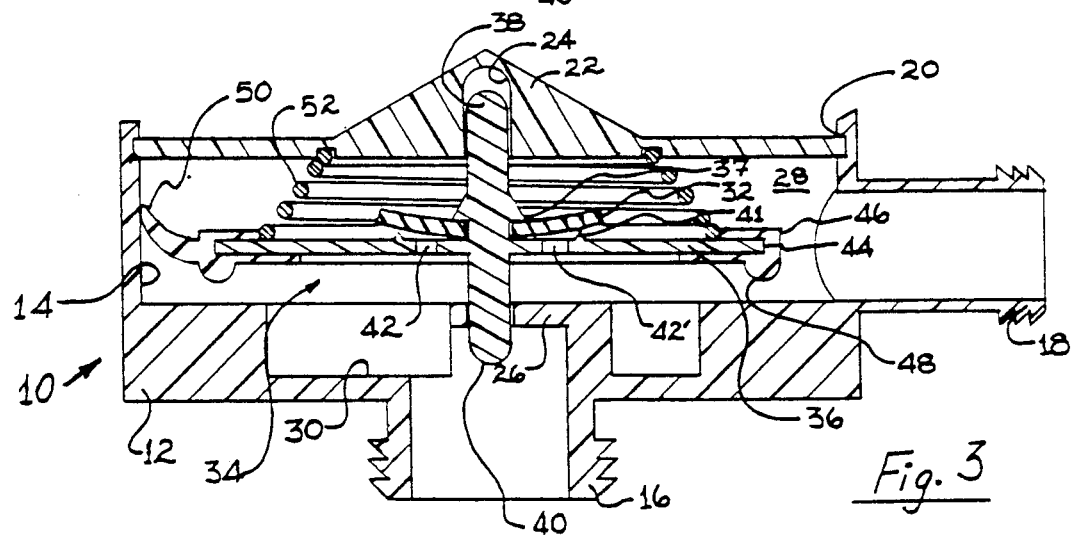

When the operational pressure differential is greater than the spring force of spring 52, a second operational differential pressure is created to develop a second force which acts on the primary and secondary disc members 32 and 34 as illustrated in FIG. 3 to overcome the spring force and move annular rib 48 on flange 44 away from housing 12 to allow air to be directly evacuated from the power assist booster by flowing from groove 30 to the outlet port 18 to rapidly lower the fluid pressure of air. As the secondary disc member 34 moves in chamber 28 the engagement of stems 38 and 40 with guides 24 and 26 respectively keeps the flange member 44 aligned over its seat in housing 12. As the air is rapidly evacuated from the power assist booster, turbulence can occur in the flow because of engagement with ribs and the unstable conditions caused by the varying force relationship between the spring force and second pressure differential force and as a result it is possible to create harmonic vibrations in the second disc member 34. When the second disc member 34 moves within chamber 28, tang 50 engages bore 14 to attenuate the development of vibrations to aid in maintaining the second disc member 34 in a stable condition. While only one tang 50 is shown, in some brake systems where a considerable volume of air is required to be evacuated from the power assist booster it may be necessary to provide additional tangs to maintain such stability. When the fluid pressure of the air in the power assist booster has been sufficiently reduced, the spring force of spring 52 again acts on the secondary disc member 34 to move annular rib 48 on flange into a seating position on housing 12 to terminate the flow air from the inlet port 16 by way of the groove 30 and reinstitute the evacuation of air through plurality of openings 42, 42' under the control of the primary disc member 32. Thereafter evacuation occurs through the primary disc member as illustrated in FIG. 2 until the fluid pressure in the power assist booster is substantially equal to the source of vacuum and the internal resiliency of the primary disc member 32 returns or repositions the primary disc member 32 on annular seat 41 as shown in FIG. 1 to seal the inlet port 16 from the outlet port 18.

I claim:

1. A check valve for use in the evacuation of air from a system, comprising:

a housing having a chamber with a groove connected to an inlet port, said inlet port being connected to a first member in said system, said chamber having an outlet port connected to a source of vacuum;

primary and secondary disc members located in said chamber for controlling the evacuation of air from said first member by said source of vacuum;

said secondary disc member having a first stem that extends from substantially the center thereof, a plurality of openings that surround said first stem and a peripheral surface thereon, said first stem having a shoulder thereon, said first stem being retained in a first guide for locating said peripheral surface over said groove in said housing;

said primary disc member being flexibly retained on said first stem of said secondary disc member by said shoulder, said primary disc member being substantially parallel to said secondary disc member and extending to cover said plurality of openings therein; and resilient means located in said chamber for urging said peripheral surface on said secondary disc member into engagement with said housing, said source of vacuum and any air in said first member developing an operational pressure differential across said primary and secondary disc members, when said operational pressure differential is less then that of the spring force of said resilient means a first pressure differential creates a first force which moves said primary disc member away from said plurality of openings to allow said vacuum to evacuate air from the first member and to reduce the fluid pressure of the air in said first member to substantially the fluid pressure of said source of vacuum and when said operational pressure differential is greater than said spring force a second operational pressure differential creates a second force which overcomes said resilient means to move said secondary disc member and peripheral surface thereon away from said housing to allow air to flow from the inlet port through the chamber to the outlet port to lower the fluid pressure of air in the first member to a fluid pressure where the force of the resilient means against moves said peripheral surface back into engagement with said housing to terminate the flow of air from the inlet port by way of the groove and reinstitute air flow from said first member to the outlet port through said plurality of openings until the fluid pressure in said first member is substantially equal to said source of vacuum.

2. The check valve for use in the evacuation of air from a system as recited in claim 1 wherein said secondary disc member includes:
 a flange member which surrounds said peripheral surface, said flange member having an annular rib that engages said housing to seal said groove from said chamber once the fluid pressure for developing said first fluid pressure differential is obtained.

3. The check valve for use in evacuation of air from a system as recited in claim 2 wherein said flange member includes:
 a tang that extends to and engages said housing to attenuate harmonic vibration in said secondary disc member when air flows between said annular rib and the housing to the outlet port.

4. The check valve for use in the evacuation of air from a system as recited in claim 3 wherein said secondary disc member further includes:
 a second stem extending from said secondary disc member and engaging a second guide in said housing to maintain said secondary disc in alignment over said groove.

5. The check valve for use in the evacuation of air from a system as recited in claim 4 wherein said tang provides a lateral extension which maintains said secondary disc member in axial alignment within the chamber to further prevent harmonic vibrations in said secondary member.

6. The check valve for use in evacuation of air from a system as recited in claim 2 wherein said flange member includes:
 a plurality of tangs that extends to and engages said housing to maintain said secondary disc member in axial alignment within said chamber and attenuate harmonic vibration in said secondary disc member when air flows between said annular rib and the housing to the outlet port.

* * * * *